United States Patent [19]

Kondo

[11] Patent Number: 4,855,933

[45] Date of Patent: Aug. 8, 1989

[54] LINE FIGURE CONNECTING APPARATUS

[75] Inventor: Takashi Kondo, Yokohama, Japan

[73] Assignee: Kabushiki Kaisha Toshiba, Kawasaki, Japan

[21] Appl. No.: 100,618

[22] Filed: Sep. 24, 1987

[30] Foreign Application Priority Data

Dec. 15, 1986 [JP] Japan .................................. 61-298392
May 30, 1987 [JP] Japan .................................. 62-136255

[51] Int. Cl.⁴ ........................... G06K 9/44; G06K 9/36
[52] U.S. Cl. ...................................... 364/518; 382/55; 382/56
[58] Field of Search ................ 364/518; 358/166, 260, 358/261.1, 261.2, 261.3, 261.4, 280; 382/41, 54, 55, 56

[56] References Cited

U.S. PATENT DOCUMENTS

| | | | |
|---|---|---|---|
| 3,846,754 | 11/1974 | Oka et al. ............................... | 382/55 |
| 4,010,446 | 3/1977 | Kawa ........................... | 340/146.3 H |
| 4,229,768 | 10/1980 | Kurahayashi et al. ............... | 358/261 |
| 4,368,462 | 1/1983 | Crawley ............................... | 340/723 |

OTHER PUBLICATIONS

Image Analysis and Mathematical Morphology; J. Serra; 1982, Academic Press, pp. 40–41.
A Reader for Logic Circuit Diagrams; T. Kondo, M. Tabata, M. Kidode; 1983, Proceeding of 27th IPSJ, pp. 961–962.
Tosgraph, A Reader for Hand-Written Diagrams; H. Kurasaki, K. Mori, S. Tsunekawa; 1985, Proceeding of 30th IPSJ, pp. 1211–1212.

*Primary Examiner*—A. D. Pellinen
*Assistant Examiner*—David Osborn
*Attorney, Agent, or Firm*—Oblo, Spivak, McClelland, Maier & Neustadt

[57] ABSTRACT

An image enhancement apparatus for performing connection processing for connecting only omissions in an input line figure, including a background figure skeletonization cirucit for skeletonizing background pixel data of binary image f0 obtained by digitizing a line figure into one-line pixel data and the background pixel data, skeletonization being performed to the degree of a one-dot line width, and for generating image f1, a gap filling cirucit for generating image f2 obtained by pixel data of the one-dot line width of image f1 into on-line pixel data, a connection pixel detector for skeletonizing the on-line pixel data of image f2 by a predetermined number of steps and generating image f3, a connection candidate detector for calculating adjacent pixels of the on-line pixel of image f0 according to an AND signal of image f0 and its inverted image f0 and for generating image f4 representing a connection candidate area, a connection pixel thickening circuit for thickening the one-dot line width pixel data of image f3 within image f4 and for generating image f5, and an OR circuit for generating an OR signal of images f0 and f5.

14 Claims, 8 Drawing Sheets

| a | b | c | d | e | f | g | h | i | OUTPUT |
|---|---|---|---|---|---|---|---|---|--------|
| 0 | 0 | 0 | 0 | 0 | 0 | 0 | 0 | 0 | 0 |
| 0 | 0 | 0 | 0 | 0 | 0 | 0 | 0 | 1 | 0 |
| 0 | 0 | 0 | 0 | 0 | 0 | 0 | 1 | 0 | 1 |
| | | | | ≀ | | | | | |
| 0 | 0 | 0 | 1 | 1 | 1 | 1 | 0 | 0 | 1 |
| 0 | 0 | 0 | 1 | 1 | 1 | 1 | 0 | 1 | 1 |
| 0 | 0 | 0 | 1 | 1 | 1 | 1 | 1 | 0 | 1 |
| | | | | ≀ | | | | | |
| 1 | 1 | 1 | 1 | 1 | 1 | 1 | 1 | 1 | 1 |

LINE FIGURE CONNECTING APPARATUS

BACKGROUND OF THE INVENTION

The present invention relates to a line figure connecting apparatus for processing disconnections of input line figures.

A drawing apparatus is commercially available in which drawing information representing handwritten line figures is input and printed. In such a conventional drawing apparatus, read line figures are analyzed, and symbols and connections between a plurality of symbols are recognized.

When such graphic processing is to be performed, it is important to correctly recognize the input line figures. However, in practice, omissions often occur in the line figure itself to be processed, or omissions are often formed in the line figure due to poor precision of an image pickup device in the drawing apparatus. For these reasons, connection processing is performed for the omissions in the input line figures.

In conventional connection processing, the input line figure is thickened to connect the omissions and then the thickened figure is skeletonized to restore the original size.

Figure 1A:
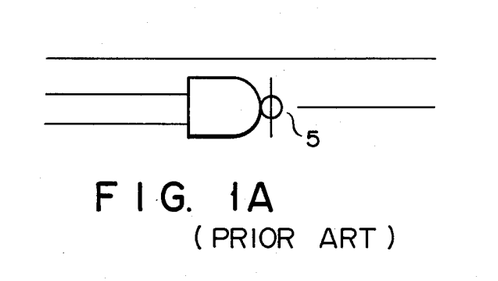
Figs. 1A through 1C are views for explaining a disadvantage of a conventional drawing apparatus.
Figure 1B:
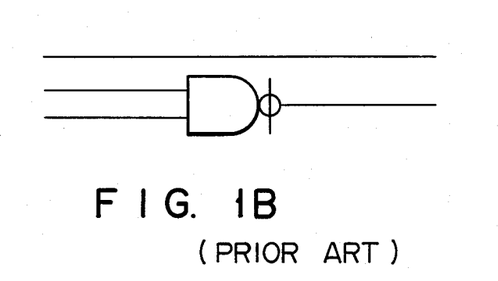
Figure 1C:
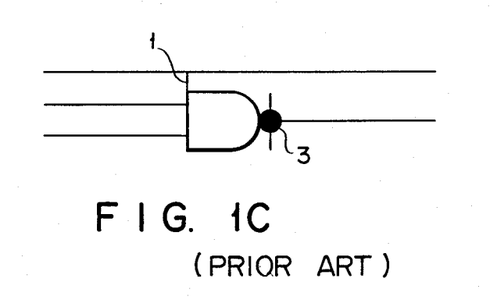

In conventional connection processing, since the input line figure is entirely thickened, thin line segments of the input line figure, e.g., parallel lines, are undesirably combined. In addition, if there is a small hole in a line segment, which represents exclusion of a value at a point in the line segment, it is undesirably changed into a black dot. Assume that a line figure having an omission shown in FIG. 1A is subjected to connection processing to obtain a line figure shown in FIG. 1B. However, according to conventional processing, line segments having the same distance as a length of an omission are connected by line segment 1, and small hole 3 is undesirably expressed as a black dot, as shown in FIG. 1C.

SUMMARY OF THE INVENTION

It is an object of the present invention to provide a connecting apparatus for performing connection processing for connecting only omissions in an input line figure.

In order to achieve the above object of the present invention, there is provided a line figure connecting apparatus comprising: image data input means for digitizing line figure image data into on-line pixel data and background pixel data; background figure skeletonizing means, connected to the image data input means, for skeletonizing the background pixel data of the input image data by a predetermined number of steps; gap filling means, connected to the background figure skeletonizing means, for converting into the on-line pixel data a pixel area in which the skeletonized background pixel data has a 1-dot line width; connection picture element detecting means, connected to the background figure skeletonizing means and said gap filling means, for skeletonizing the on-line picture element data obtained by the gap filling means, by a predetermined number of steps, and for detecting pixels each having a 1-dot line width; connection candidate detecting means, connected to the image data input means and the gap filling means, for calculating pixel data around the on-line pixel data of the image data input from the digitizing means to detect a connection candidate area; connection pixel thickening means, connected to the connection pixel detecting means and the connection candidate detecting means, for thickening the connection pixels detected by said connection pixel detecting means within the connection candidate area; and logical sum means, connected to the image input means and the connection pixel enlarging means, for combining on-line pixel data from the connection pixel thickening means and the image data input from the digitizing means.

BRIEF DESCRIPTION OF THE DRAWINGS

Other objects and features of the present invention will be apparent from the following description taken in connection with the following drawings, in which.

DETAILED DESCRIPTION OF THE PREFERRED EMBODIMENT

Figure 2:
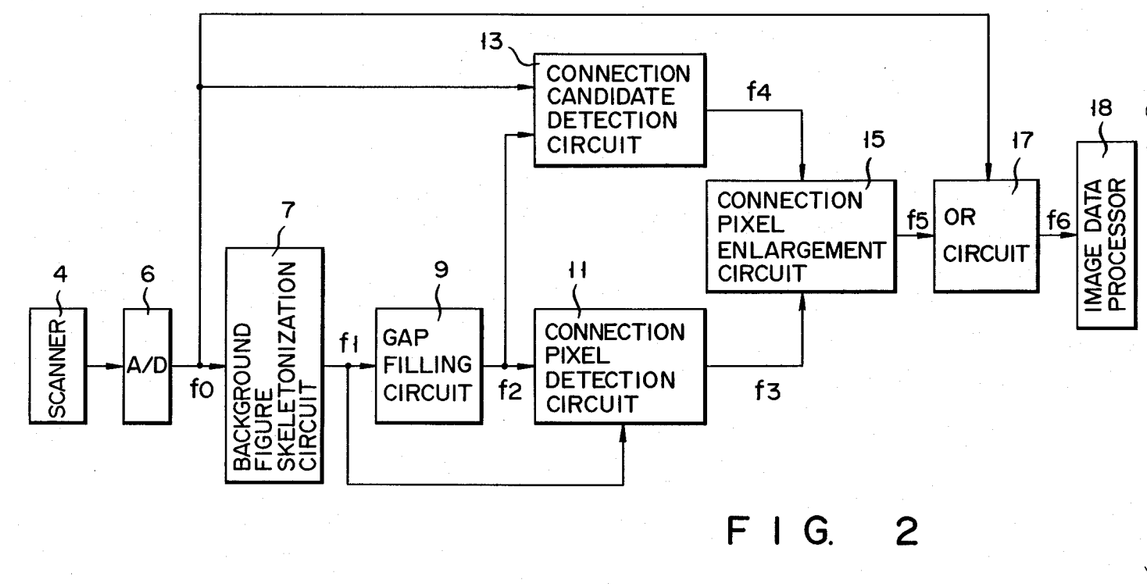
FIG. 2 is a block diagram of a line figure connecting apparatus according to an embodiment of the present invention.

FIG. 2 is a block diagram of a line figure connecting apparatus according to an embodiment of the present invention. This line figure connecting apparatus is used as, for example, a preprocessor in a graphic processing system. Line figure image f0 is input to the line figure connecting apparatus. Image f0 is a line figure input from a TV camera or scanner 4 and is digitized through A/D converter 6. For example, when image f0 shown in FIG. 1A is input, omission 5 in image f0 is subjected to connection processing, and output image f6 shown in FIG. 1B is generated and output to image data processor 18.

In this embodiment, a pixel on a line of the binary line figure is defined as logic "1", and a background pixel is defined as logic "0", or vice versa. That is, different values are assigned for the pixel on a line and the background pixel.

Input line figure f0 is input to background figure skeletonization circuit 7. Skeletonization circuit 7 in this embodiment does not perform skeletonization for a line width of less than one dot.

Figure 3A:
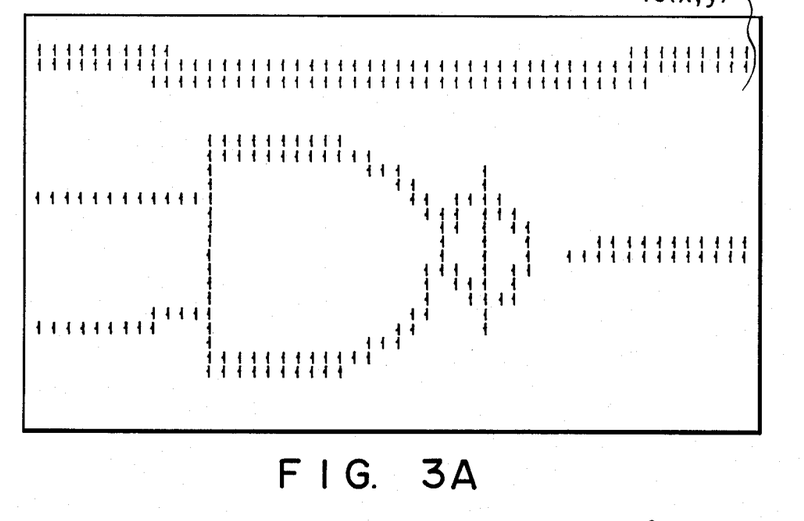
FIGS. 3A through 3G are diagrams showing connection processing procedures in the apparatus shown in FIG. 2.

Assume that input image f0 shown in FIG. 1A is given as a set of pixels f0(x,y) shown in FIG. 3A. Only an on-line pixel in FIGS. 3A through 3G is given as logic "1" or "①", and the background pixel of logic "0" is not illustrated. However, necessary background pixels are repesented by "*".

Figure 3B:
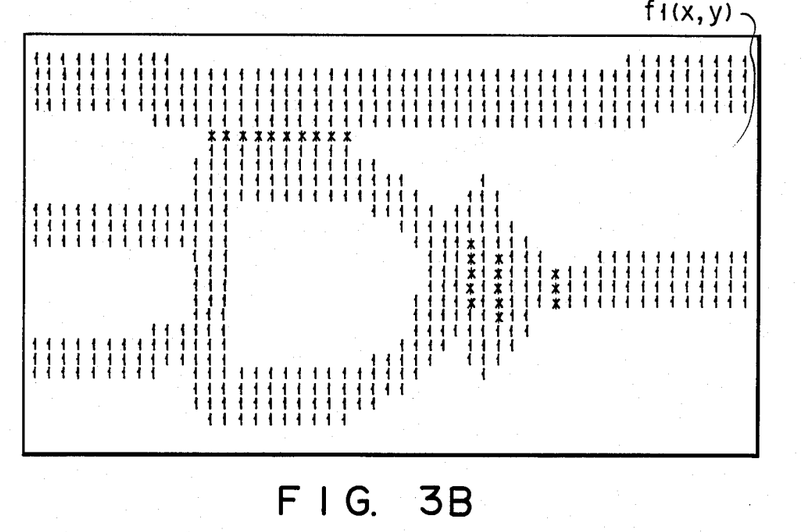
Figure 4:
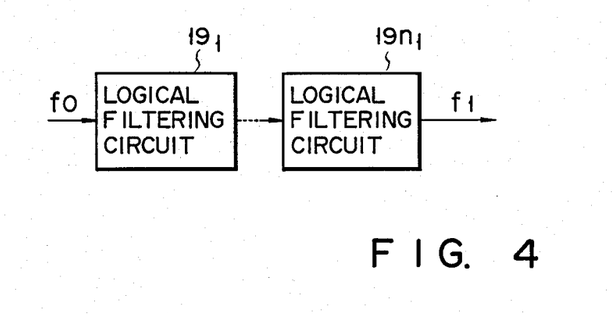
FIG. 4 is a detailed block diagram of a background figure skeletonization circuit shown in FIG. 2.

Background figure skeletonization circuit 7 skeletonizes the background of input line image f0(x,y) by n1 steps to generate background skeletonized image f1(x,y) shown in FIG. 3B. The n1 steps are represented by an integer of 1 or more and represent a length for connection processing. For example, if n1=1, then a 2-dot width is subjected to connection processing. Skeletonization of the background corresponds to conventional thickening of a line figure. However, in this embodiment skeletonization is not a mere thickening of a line figure but differs therefrom in that the background pixels of line width (1) represented by "*" are not thickened but are left unchanged. "Thickening" is defined as an operation for changing background pixels of logic "0" into those of logic "1" to draw a line. "Line width" (1) is defined as a width of one-dot line. In the conventional thickening of a line figure, the background having a line width (1) is also subjected to thickening, and background information is often lost. However, in background skeletonization in this embodiment, the background having line width (1) is left unchanged. Background figure skeletonization circuit 7 comprises logical filtering circuits $19_1, \ldots 19n1$ of $2 \times n1$. Each filtering circuits $19_1$ through $19n1$ has an arrangement shown in FIG. 5 and comprises five shift registers 23, 25, 27, 29, and 31 and table memory 33. Each shift register 23 and 25 serves for one line buffer of input pixels, and each shift register, 27, 29 and 31 is, for example, a 3-bit shift register. Each shift register 27, 29, or 31 serves a buffer for temporarily storing 3-dot pixel data. More specifically, nine dot pixel data a, b, c, d, e, f, g, h, and i are sequentially input to logical filtering circuits $19_1$ through $19n1$ shown in FIG. 4, and filtering circuits $19_1$ through $19n1$ performs serial-to-parallel conversion. Therefore, 9-dot pixel data can be simultaneously input to table memory 33. The 9-dot pixel data is input as address data to table memory 33. Each shift registers 23 or 25 delays the raster-scanned and sequentially input pixel data by one line. Shift registers 27, 29, and 31 delay the pixel data of one line ahead of the current line, the pixel data of two lines ahead of the current line, and the pixel data of the current line, by two pixels, respectively and generate signals of three succeeding pixels. Table memory 33 receives the 9-dot pixel data as address data and outputs pixel data corresponding to the input address data. Pixel data a, b, c, d, e, f, g, h, and i input to table memory 33 constitute $3 \times 3$ pixel data, as shown in FIG. 6A. Table memory 33 prestores output pixel data corresponding to input pixel data a through i. The table representing their relationship is shown in FIG. 6B. By such table conversion, outputs corresponding to values of nine pixel data a through i can be obtained. Pixel data e representing the central pixel is logically filtered according to other eight adjacent pixels.

Figure 5:
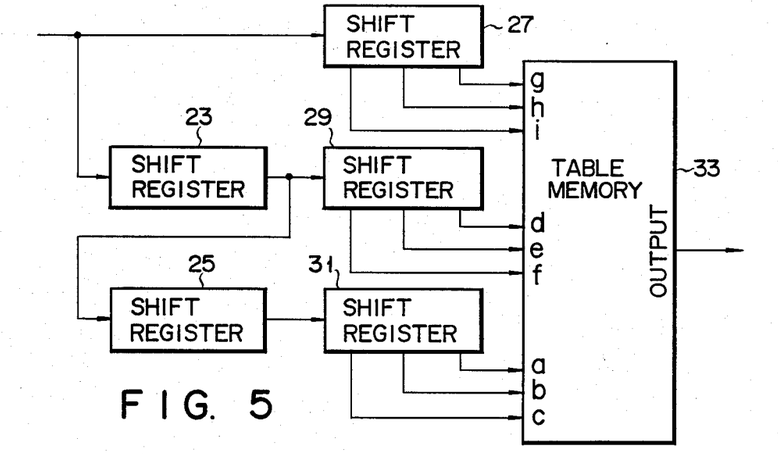
FIG. 5 is a detailed block diagram of a logical filtering circuit shown in FIG. 4.
Figure 6A:
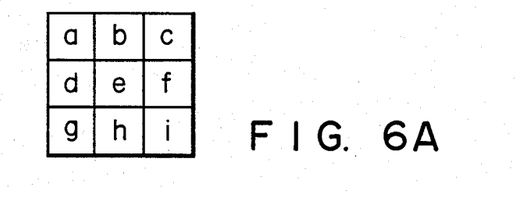
FIG. 6A is a view showing picture element data input to a table memory shown in FIG. 5.
Figure 6B:
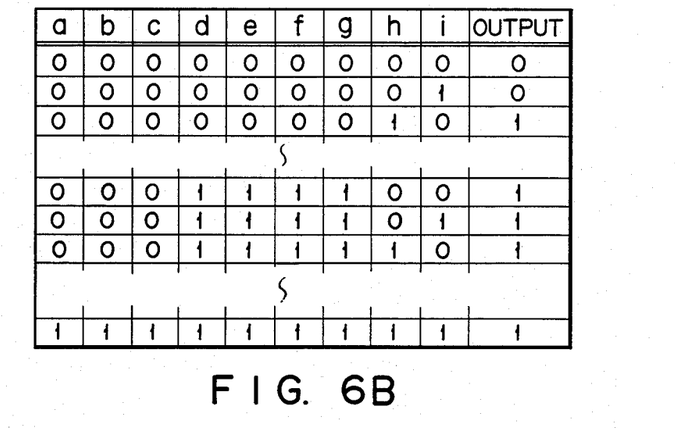
FIG. 6B is a table showing the correspondence between the input image data stored in the table memory (FIG. 5) and output picture element data.
Figure 7:
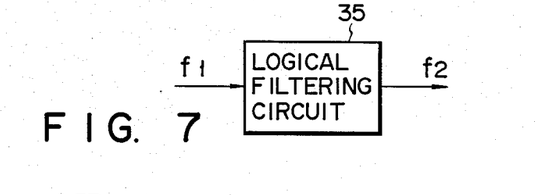
FIG. 7 is a detailed block diagram of a gap filling circuit shown in FIG. 2.
Figure 8:
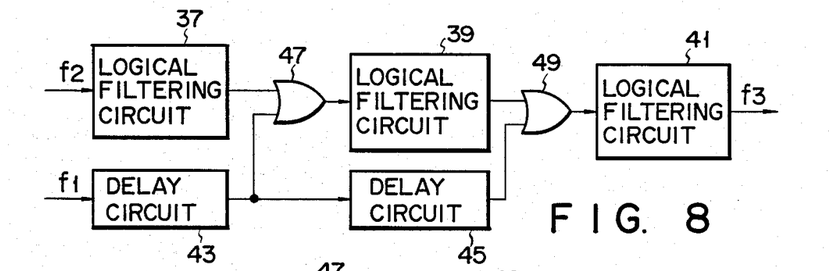
FIG. 8 is a detailed block diagram of a connection picture element detection circuit shown in FIG. 2.
Figure 10:
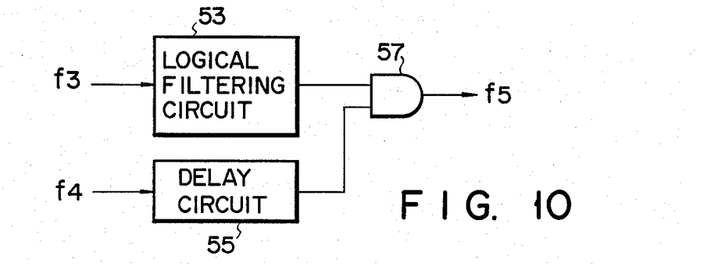
FIG. 10 is a detailed block diagram of a connection picture element thickening circuit shown in FIG. 2.

Logical filtering circuits shown in FIGS. 7, 8 and 10 have the same arrangement as that in FIG. 5. However, the contents (FIG. 6B) of table memories 33 for the logical filtering circuits differ from each other. In this embodiment, when one of the upper, lower, right, and left pixels (i.e., pixel data b, d, f, and h) is set at logic "1", a logical filtering output for the central pixel represented by picture element data e is set at logic "1". Therefore, an output value stored in table memory 33 can be represented by the following equation when a logical OR sign is represented by "+":

Output Value=b+d+e+f+h

Skeletonization logical filtering basically employs the following logic and logic symmetrical therewith (i.e., inverted logic) when skeletonization from the top and the left has a priority over other skeletonization directions. The above types of logic are alternatively performed. Logical filtering circuits $19_1$ through $19n1$ constituting background figure skeletonization circuit 7 in FIG. 2 employ the following logic, and the inverted logic thereof, alternatively, as follows:

One logic Employed by Filtering Circuit:
If a=b=c=0 AND g=h=i=1, then the output value is set at logic "0";
If a=d=g=0 AND c=f=i=1, then the output value is set at logic "0";
If d=g=h=i=0 AND a=b=f=1, then the output value is set at logic "0";
If b=c=f=i=0 AND d=h=1, then the output value is set at logic "0"; and
Otherwise, the output value is set to be "e".

Another Logic Employed by Filtering Circuit:
If g=h=i=0 AND a=b=c=1, then the output value is set at logic "0";
If c=f=i=0 AND a=d=g=1, then the output value is set at logic "0";
If a=b=c=f=0 AND d=h=i=1, then the output value is set at logic "0";
If a=d=g=h=0 AND b=f=1, then the output value is set at logic "0"; and
Otherwise, the output value is set to be "$\bar{e}$".

Figure 3C:
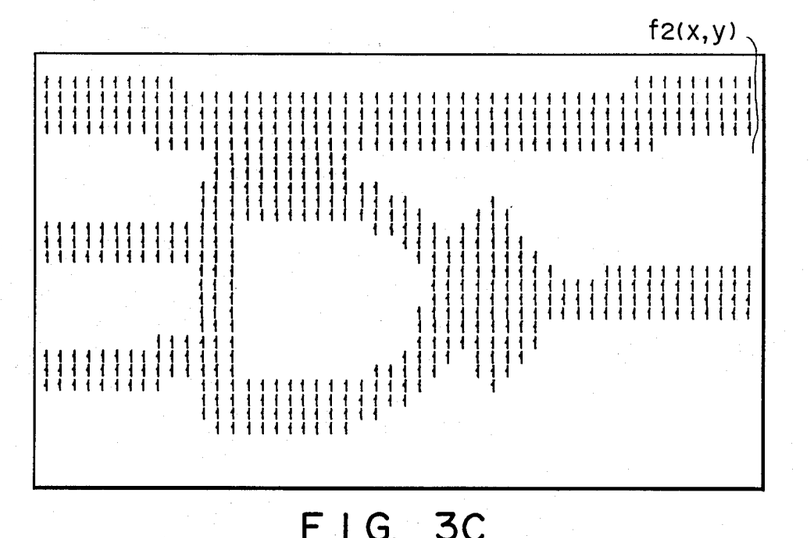

Gap filling circuit 9 for line width (1) receives background skeletonized image f1(x,y) and converts the background pixels having line width (1) of image f1(x,y) into logic "1", thereby filling the gap. By gap filling, the pixels having line width (1) and represented by "*" are converted into logic "1", and therefore gap-filled image f2(x,y) shown in FIG. 3C is obtained.

Gap-filled image f2(x,y) is substantially the same as that obtained by simply thickening the input line figure f0(x,y) by n1 steps. Gap filling circuit 9 can be arranged by one logical filtering circuit 35 shown in FIG. 7. The detailed arrangement of logical filtering circuit 35 is the same as that shown in FIG. 5. In this case, the corresponding table on the basis of the following logic is stored in table memory 33:

If d=f=1 OR b=h=1, then the output value is set at logic "1"; and
Otherwise, the output value is set to be "e".

Connection picture element detection circuit 11 maintains information of background skeletonized image f1(x,y). Whenever gap-filled image f2(x,y) (i.e., the width of the line represented by "1" in FIG. 3C is decreased vertically and horizontally by one dot) is skeletonized by one step, detection circuit 3 calculates an OR product of gap-filled or skeletonized image f2(x,y) and background skeletonized image f1(x,y). The resultant logical OR image is defined as new skeletonized image f2(x,y). This operation is repeated by n2 steps to obtain final skeletonized image f3(x,y). It should be noted that skeletonization of less than one dot is not performed. More specifically, f2'(x,y) ⟵ f2(x,y)   skeletonization $$f2(x,y) \leftarrow f2'(x,y) \text{ OR } f1(x,y)$$

the above operations are repeated.

The above processing is processing opposite to skeletonization of the background and corresponds to processing in which the background is skeletonized while pixels in a line figure having a one-dot line width are left unchanged. Pixels for a line figure having a one-dot line width are obtained as connection candidates, as indicated by ① in FIG. 3D. Connection pixel detection circuit 11 can be realized by using three filtering circuits 37, 39, and 41 delay circuits 43 and 45, and OR gates 47 and 49, as shown in FIG. 8. First two logical filtering circuits 37 and 39 perform the above-mentioned skeletonization processing while image f1 delayed by a time required for such logical filtering processing is logically ORed with skeletonized image f2. Thereafter, a location having a one-dot line width is detected by last logical filtering circuit 41.

The detailed arrangement of each filtering circuit 37, 39, or 41 is shown in FIG. 5. The table memory in last logical filtering circuit 41 for detecting the location having a one-dot line width in detection circuit 11 stores an output table based on the following logic:

If $d=f=0$ AND $e=1$, then the output value is set at logic "1";

If $b=h=0$ AND $e=1$, then the output value is set at logic "1"; and

Otherwise, the output value is set to be "e".

Figure 3D:
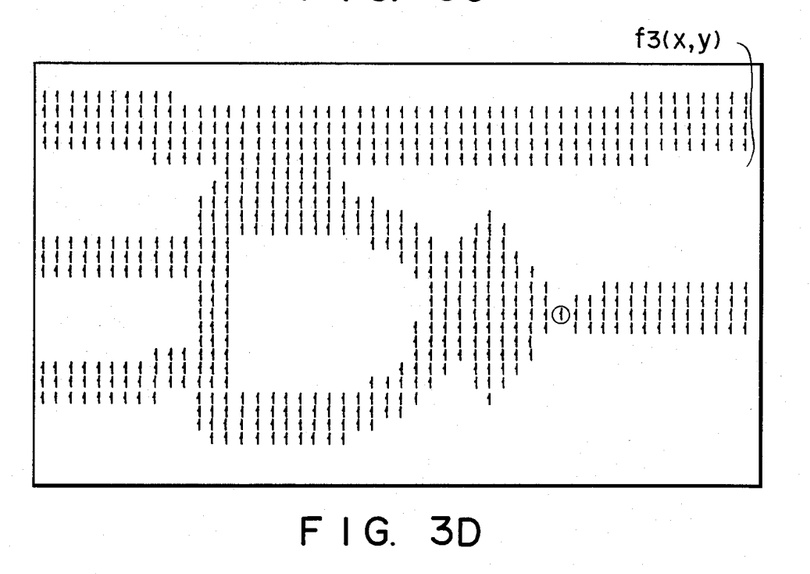
Figure 3E:
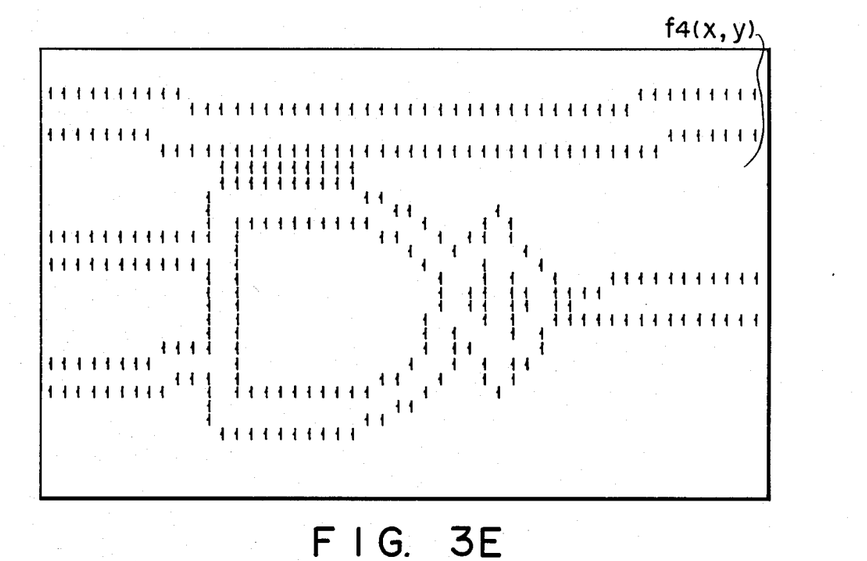

Connection candidate detection circuit 13 receives input line image f0(x,y) and gap-filled image f2(x,y) obtained by gap filling circuit 9 and detects pixels around a line segment of f0(x,y). These pixels constitute connection candidate area image f4(x,y), as shown in FIG. 3E. The inner area defined by the line segments of image f4(x,y) is obtained as a connection candidate area.

Connection candidate detection processing is performed by calculating a logical AND product of gap-filled image f2(x,y) and an image obtained by inverting input line image f0(x,y) as follows:

$$f4(x,y) \leftarrow f2(x,y) \text{ AND } \overline{f0(x,y)}$$

Figure 9:
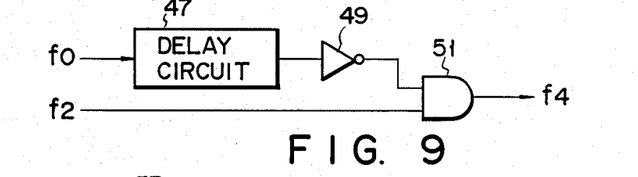
FIG. 9 is a detailed block diagram of a connection candidate detection circuit shown in FIG. 2.

In connection candidate detection circuit 13, as shown in FIG. 9, delay circuit 47 delays image signal f1, the delayed signal is inverted by inverter 49, and AND gate 51 generates an AND signal of inverted output signal f0 from inverter 49 and image signal f2.

Connection picture element thickening circuit 15 receives skeletonized image f3(x,y) and connection candidate area image f4(x,y) and extracts only pixels corresponding to the one-dot line width in skeletonized image f3(x,y) and falling within the connection candidate area represented by image f4(x,y). In this embodiment, only pixels represented by ① in skeletonized image f3(x,y) shown in FIG. 3D are extracted.

Figure 3F:
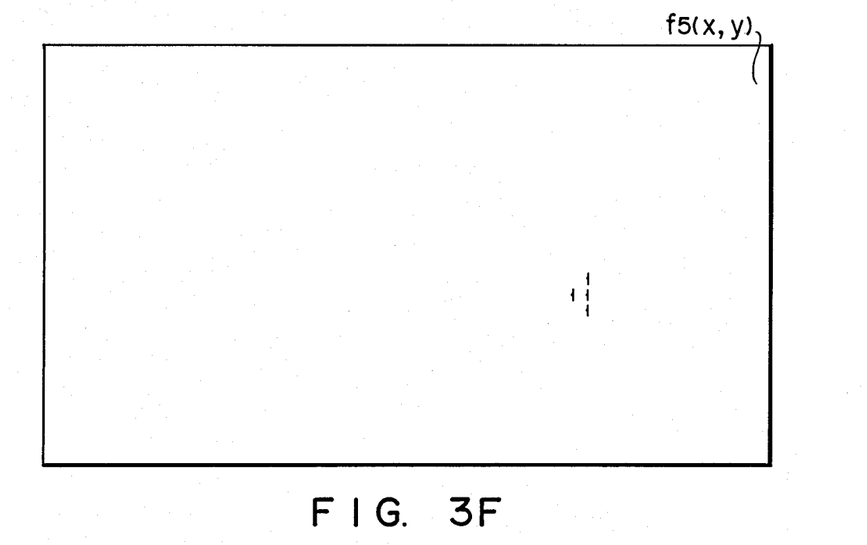

The extracted pixels are thickened within the connection candidate area to obtain connection pixel image f5(x,y) shown in FIG. 3F. In the above processing, whenever the one-dot line figure in the skeletonized image f3(x,y) is thickened by one step, this image is logically ANDed with an image which determines connection candidate area image f4(x,y), and the operation is repeated by n3 times (where n3 represents a value equal to n1 or n1+1).

As a result, new pixels constituting a line segment are generated within the connection candidate area, and connection image f5(x,y) is obtained. In connection pixel thickening circuit 15, as shown in FIG. 10, an output from logical filtering circuit 53 for storing the above-mentioned thickening logic is logically ANDed by an AND gate 57 with image signal f4 delayed by the logical filtering time by delay circuit 55.

Figure 3G:
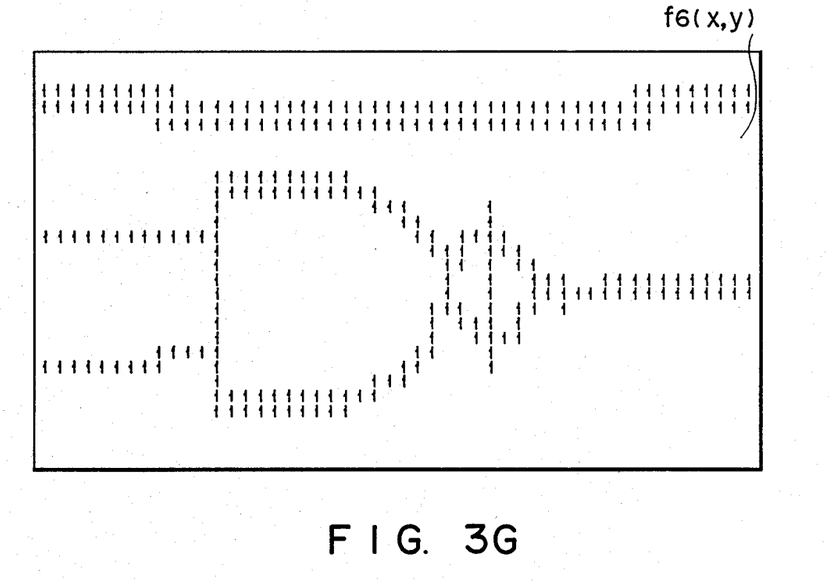
Figure 11:
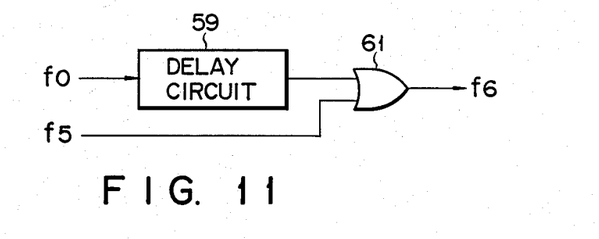
FIG. 11 is a detailed block diagram of an OR circuit shown in FIG. 2.

Connection pixel image f5(x,y) is inserted in image f0(x,y). These images are combined as an OR signal by OR circuit 17, and therefore input line figure f6(x,y) is obtained, as shown in FIG. 3G. OR circuit 17 comprises delay circuit 59 and OR gate 61, as shown in FIG. 11 and calculates an OR signal of signals f0 and f5.

The line figure connecting circuit according to the present invention can be easily arranged by using logical filtering circuits. Processing is performed while background information is left unchanged by skeletonizing the background. Connection pixels are obtained in only an area between two background portions. Therefore, an area (hole portion) surrounded by the line figure is undesirably filled or parallel lines are not undesirably connected. As shown in FIG. 1A, the input line image is not processed into the output line image shown in FIG. 1C. Therefore, only the omission in the input image can be easily processed, as described above, and the output line image shown in FIG. 1B can be obtained.

What is claimed is:

1. A line figure connecting apparatus comprising:
   digitizing means for digitizing line figure image data into a first value indicating pixel data on line figure and a second value indicating background pixel data;
   background figure skeletonizing means, connected to said digitizing means, for skeletonizing the background pixel data of the input image data by a predetermined number of steps;
   gap filling means, connected to said background figure skeletonizing means, for converting into the pixel data on line figure a pixel area in which the skeletonized background pixel data has a 1-dot line width;
   connection picture element detecting means, connected to said background figure skeletonizing means, for skeletonizing the picture element data on line figure obtained by said gap filling means, by a predetermined number of steps, and for detecting pixels each having a 1-dot line length;
   connection candidate detecting means, connected to said digitizing means and said gap filling means, for calculating pixel data around the pixel data on line figure of the image data input from said digitizing means to detect a connection candidate area;
   connection pixel thickening means, connected to said connection pixel detecting means and said connection candidate detecting means, for thickening the connection pixels detected by said connection pixel detecting means within the connection candidate area; and
   logical sum means, connected to said image input means and said connection pixel thickening means, for combining the pixel data on line figure from said connection pixel thickening means and the image data input from said digitizing means.

2. An apparatus according to claim 1, wherein said connection candidate detecting means calculates an AND product of an image obtained by said gap filling means and an inverted image of the input image to obtain the adjacent pixels around pixel data of on line figure of the input image and detects the adjacent pixels to constitute the connection candidate area.

3. An apparatus according to claim 1, wherein said background figure skeletonizing means skeletonizes the background pixel data and inhibits further skeletonization when the line width of the skeletonized background pixel data is less than one dot.

4. An apparatus according to claim 1, wherein said background figure skeletonizing means comprises logical filtering circuits of $2^n$ (n: an integer), each comprising pixel data serial-to-parallel converting means for converting input serial pixel data into parallel pixel data and outputting the parallel pixel data and a conversion table memory for receiving the parallel pixel data as address data and storing output values corresponding to pixel values of the parallel pixel data.

5. An apparatus according to claim 4, wherein the serial pixel data comprise pixel data a, b, c, d, e, f, g, h, and i, and said background figure skeletonizing means comprises two types of logical filtering circuits, one type of logical filtering circuits being provided with a table memory for storing the output values on the basis of logic:

if a=b=c=0 AND g=h=i=1, then the output value is set at logic "0";
if a=d=g=0 AND c=f=i=1, then the output value is set at logic "0";
if d=g=h=i=0 AND a=b=f=1, then the output value is set at logic "0";
if b=c=f=i=0 AND d=h=1, then the output value is at logic "0"; and
Otherwise, the output value is set to be "e",
the other type of filtering circuits being provided with a table memory for storing the output values on the basis of logic:
if g=h=i=0 AND a=b=c=1, then the output value is set at logic "0";
if c=f=i=0 AND a=d=g=1, then the output value is set at logic "0";
if a=b=c=f=0 AND d=h=i=1, then the output value is set at logic "0";
if a=d=g=h=0 AND b=f=1, then the output value is set at logic "0"; and
otherwise, the output value is set to be "$\bar{e}$".

6. An apparatus according to claim 13, wherein said gap filling means comprises a third logical filtering circuit which comprises pixel data serial-to-parallel converting means for converting serial input pixel data into parallel pixel data and outputting the parallel pixel data, and a conversion table memory for receiving pixel data a, b, c, d, e, f, g, h, and i as address data and storing output values corresponding to pixel values of the parallel pixel data.

7. An apparatus according to claim 6, wherein said table memory in said third logical filtering circuit stores the output values on the basis of logic:

if d=f=1 OR b=h=1, then the output value is set at logic "1"; and
otherwise, the output value is set to be "e".

8. An apparatus according to claim 13, wherein said connection pixel detecting means comprises a fourth logical filtering circuit for skeletonizing pixel data output from said gap filling means, a first delay circuit for delaying the pixel data from said data input means, a first OR gate for generating an OR signal of an output from said fourth logical filtering circuit and an output from said first delay circuit, a fifth logical filtering circuit for skeletonizing an output from said first OR gate; a second delay circuit for further delaying an output from said first delay circuit, a second OR gate for generating an OR signal of an output signal from said fifth logical filtering circuit and an output from said second delay circuit, and a sixth filtering circuit for detecting a location of the one-dot line width.

9. An apparatus according to claim 8, wherein said sixth logical filtering circuit comprises pixel data serial-to-parallel converting means for converting serial pixel data a, b, c, d, e, f, g, h, and i into parallel pixel data and outputting the parallel pixel data, and a conversion table memory for receiving the parallel pixel data as address data and storing output values corresponding to pixel values of the parallel pixel data, said conversion table in said sixth logical filtering circuit being adapted to store the output values on the basis of logic:

if d=f=0 AND e=1, then the output value is set at logic "1".

10. An apparatus according to claim 13, wherein said connection candidate detecting means comprises a third delay circuit for delaying the pixel data from said image data input means, inverting means for inverting an output from said third delay circuit, and a first AND gate for generating an AND signal of an output from said inverting means and the pixel data from said gap filling means.

11. An apparatus according to claim 13, wherein said connection pixel thickening means comprises a seventh logical filtering circuit for thickening the pixel data from said connection pixel detecting means, a fourth delay circuit for delaying the pixel data from said connection candidate detecting means, and a second AND gate for generating an AND signal of an output from said seventh logical filtering circuit and an output from said fourth delay circuit.

12. An apparatus according to claim 13, wherein said logical sum means comprises a fifth delay circuit for delaying the pixel data from said image input means and a third OR gate for generating an OR signal of an output from said fifth delay circuit and the pixel data from said connection pixel thickening means.

13. A line figure connecting apparatus comprising:
digitizing means for digitizing line figure image data into a first value indicating pixel data on line figure and a second value indicating background pixel data;
means for skeletonizing a set of pixels having the second value by a predetermined number of steps so as to produce a one-dot width segment;
means for comparing a length of the one-dot width segment with a predetermined value; and
means for converting the background pixel data into the pixel data on line figure when the length of the one-dot width segment is smaller than the predetermined value.

14. A line figure connecting apparatus comprising:
means for digitizing line figure image data into a first value indicating pixel data on line figure and a second value indicating background pixel data;
means for skeletonizing a set of pixels having the second value by an arbitrary number of steps so as to produce a width segment;
means for comparing a length of the width segment with a predetermined value; and
means for converting the background pixel data into the pixel data on line figure when the length of the width segment is smaller than the predetermined value.

* * * * *